United States Patent [19]

Stella

[11] 4,212,521
[45] Jul. 15, 1980

[54] MOTION PICTURE FILM CASSETTE HAVING REMOVABLE FILM STRIPPING WEB

[75] Inventor: Joseph A. Stella, Peabody, Mass.

[73] Assignee: Polaroid Corporation, Cambridge, Mass.

[21] Appl. No.: 974,486

[22] Filed: Nov. 29, 1978

[51] Int. Cl.² ............................................. G03C 11/00
[52] U.S. Cl. ................................. 352/130; 352/78 R
[58] Field of Search .................... 354/83, 84; 352/130, 352/72, 78 R

[56] References Cited

U.S. PATENT DOCUMENTS

| | | | |
|---|---|---|---|
| 2,963,953 | 12/1960 | Bishop et al. | 352/130 |
| 3,455,633 | 7/1969 | Land | 352/130 |
| 3,537,784 | 11/1970 | Downey | 352/130 |
| 3,655,277 | 4/1972 | Land | 352/72 |
| 3,674,345 | 7/1972 | Chernotsky et al. | 352/31 |
| 3,711,192 | 1/1973 | Land | 352/78 R |
| 3,800,306 | 3/1974 | Land | 352/130 |

OTHER PUBLICATIONS

U.S. Patent Application Serial No. 869,131.

Primary Examiner—Monroe H. Hayes
Attorney, Agent, or Firm—David R. Thornton

[57] ABSTRACT

An emulsion stripping apparatus for removing spent layers of photographic materials from a film strip connected permanently at opposite ends to supply and take-up spools rotatable within a multi-purpose cassette in which the film strip is contained without removal during exposure, processing and projection. A stripping web of the same width as the film strip is connected releasably at one end on the supply spool and extends to the take-up spool but is not physically connected to the take-up spool. When a processing operation occurs in which the film strip is coated with processing fluid and rewound on the supply spool, the stripping web becomes interwound with the processed film strip. At the end of such processing rewind, the end of the stripping web initially extending to the take-up spool now extends in a general tangential direction from the periphery of the filled supply spool. On reverse rotation of the supply spool, such as during an ensuing projection cycle, the free end of the stripping web is directed by a deflector through an opening in the cassette to be discarded.

4 Claims, 8 Drawing Figures

MOTION PICTURE FILM CASSETTE HAVING REMOVABLE FILM STRIPPING WEB

BACKGROUND OF THE INVENTION

This invention relates to multi-purpose photographic film cassettes and more particularly, it concerns improvements in film cassettes of the type in which a film strip, connected at opposite ends to supply and take-up spools rotatably supported in the cassette, is exposed, processed and projected without removal of the film strip from the cassette.

In motion picture systems of the type now available commercially under the tradename "POLAVISION" from Polaroid Corporation of Cambridge, Massachusetts, a photographic film strip is permanently contained in a multi-purpose cassette which is inserted into a camera for exposure of the film strip and then transferred to a viewing device or "player" in which the film strip is processed and projected for viewing. Processing of the film strip without removal from the cassette is achieved by a cassette-contained supply of processing fluid and a processor capable of depositing a very thin layer of processing fluid on the inner emulsion side of the strip as it is removed from the take-up spool (on which it was wound during exposure) to the supply spool. The processing operation is followed directly by a mandatory projection cycle to assure complete drying of the fluid and/or layers of the film strip which are wet by the fluid.

The film strip currently used in the system is an additive color film structure including, in the order of light transmission during exposure, a transparent polyester carrier base, an addititive color screen, a processing fluid barrier layer, a positive image receiving layer or interface, a silver halide emulsion and an inner layer of antihalation dyes and image stablizer. When processed by coating the inner layer with a thin uniform layer of processing fluid or liquid, the chemicals contained in the processing fluid permeate the inner layer to the emulsion to develop exposed silver halide grains and render them essentially transparent. Unexposed silver halide grains migrate by diffusion to the positive image-receiving interface at which they are transformed into an opaque silver image in varying degrees of density. During and after development of the images, the antihalation dyes in the inner layer are bleached to become colorless. The negative image in the emulsion is sufficiently low in covering power relative to the positive image that the film strip may be viewed by projection of light in a direction proceeding through the inner layer, the processed emulsion layer and the remaining positive image carrying portions of the film strip and the color screen.

Though acceptable in the present commercial version of the "POLAVISION" system, the presence of the spent inner and emulsion layers on the film strip after processing and during projection can be characterized as a compromise between advantages to be gained by removal of these layers and difficulties heretofore experienced in achieving their removal while retaining the desirable characteristics of the present system, particularly those characteristics attributed to the retention at all times of the film strip in the same cassette in which it was initially packaged. A principal advantage to be gained by removing the spent inner and emulsion layers is greater transmissibility of the processed film during projection. In addition, because these layers are wet by the processing fluid immediately in advance of the film strip being rewound on the supply spool in adjacent convolutions, some provision, such as marginal side rail elevations on the film strip as in the present commercial version, must be made to separate the wet inner surface of the film strip and the adjacent face of a preceding convolution on the supply spool.

The problems resulting from retention of the spent inner and emulsion layers on the processed "POLAVISION" film strip have been recognized previously and dealt with by stripping these layers from the film after processing. See, for example, U.S. Pat. Nos. 3,455,633 and 3,711,192 issued to Edwin H. Land on July 15, 1969 and Jan. 16, 1973, respectively. While the structure of the film strip thus lends itself to stripping or removing spent inner and emulsion layers so that only positive image forming components are physically present on the film strip for projection, the difficulty in achieving the stripping operation without removal of the film strip from the cassette have been a deterrent to the actual practice of emulsion removal.

SUMMARY OF THE PRESENT INVENTION

In accordance with the present invention, the problems heretofore associated with stripping or removing spent inner and negative emulsion layers on an additive color film strip, connected permanently on opposite ends to cassette contained supply and take-up spools, are overcome by interwinding with the film strip on the supply and take-up spools, a removable stripping web which passes in a path separate from the film strip during passage between the spools in the cassette. During the processing operation, as the film strip is drawn in operative relation with the cassette contained processor for the deposition of the processing fluid and is rewound in convolutions on the supply spool, the stripping web is interwound with the film strip so that on the supply spool, one side of the web lies in contact with and adheres to the wet processing fluid on the inner and emulsion layers of the film strip. The stripping web is of a length shorter than the film strip and is releasably coupled to both spools, for example, merely interwound with the initial convolutions of the film strip on the take-up spool and adhesively coupled to the supply spool. At the end of processing, the free end of the stripping web extends loosely from the supply spool. When the film strip is then subsequently advanced or, that is, passed from the supply spool to the take-up spool during a projection cycle, the stripping web parts from the film strip, carrying with it the residual processing fluid and preferably all layers on the film strip inside of the positive image forming layers. This latter operation may be facilitated by a release agent between the emulsion layer and the positive image receiving layer of the existing film strip. An internal guide channels the stripping web through an opening in the cassette to the cassette exterior for discarding. A take-up reel may be provided on the viewing device for this purpose.

Among the objects of the present invention are, therefore: to provide an improved stripping apparatus for photographic film strips of the type afore-mentioned; the provision of such a stripping apparatus which is easily accommodated in an existing film cassette structure in which the film strip is permanently connected at opposite ends to cassette contained supply and take-up spools; the provision of a stripping apparatus for removing spent emulsions layers from such a film and which requires minimal modification of the existing cassette structure in which the film strip packaged and retained during exposure, processing and projection operations; and the provision of such a stripping apparatus which is exceedingly simple and entails minimal costs from the standpoint of both manufacturing and assembly of existing film cassettes.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
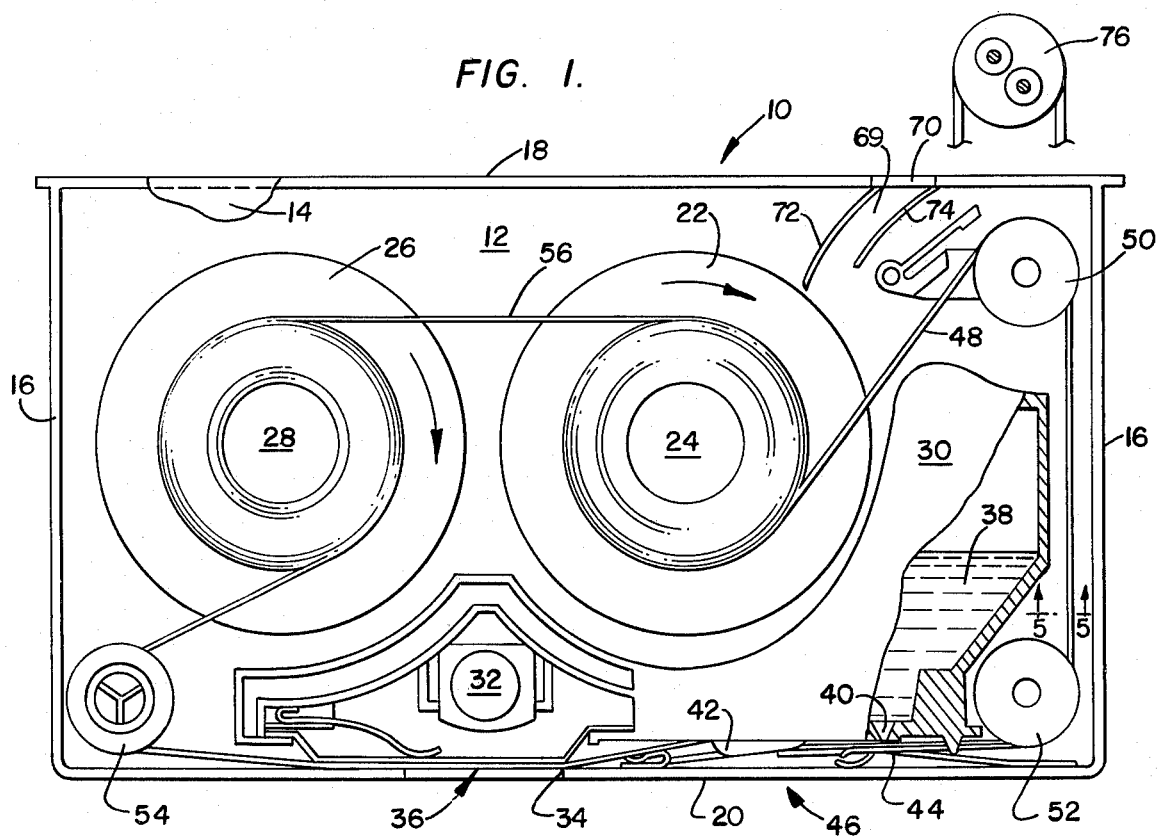
FIG. 1 is a cutaway side elevation showing interior components of a multi-purpose film cassette incorporating the present invention.

In FIG. 1 of the drawings, a multi-purpose film cassette 10 is shown in largely schematic fashion to include an exterior housing defined by spaced parallel and planar side walls 12 and 14 peripherally joined by end walls 16 and by top and bottom walls 18 and 20, respectively. Components conventionally contained within the interior of the cassette include a flanged supply spool 22 having a hub 24, a similarly flanged take-up spool 26 and associated hub 28, a processor 30 and a projection prism 32. The prism 32 overlies an opening 34 in the bottom wall 20 of the cassette 10 to establish an exposure/projection station designated generally in FIG. 1 by the reference numeral 36.

The processor 30 contains a supply of processing fluid 38 such as an aqueous processing liquid, adapted to be discharged through a nozzle 40. A pull tab (not shown), which initially holds back the fluid 38 from the nozzle 40, is released during an initial portion of the processing rewind to deliver the fluid to the nozzle as shown in FIG. 1. Also included as components of the processor 30 and shown in FIG. 1 are a valve member 42 and a pressure pad 44. These components of the processor 30 as well as others not shown provide what may be termed a processing station 46 for purposes of a clear understanding of the present invention.

Figure 5:
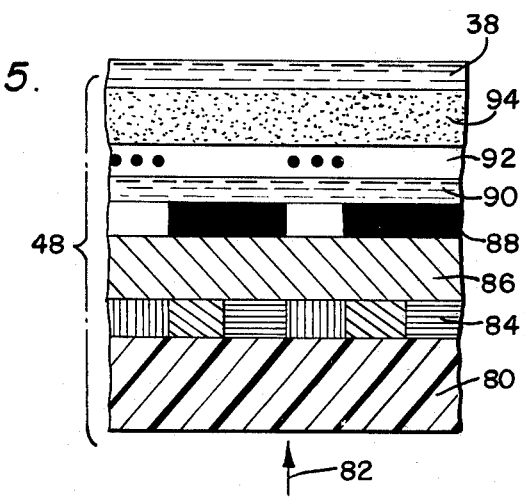
FIG. 5 is an enlarged fragmentary cross-section on line 5—5 of FIG. 1.

A photographic film strip 48, the construction of which will be subsequently described with regard to FIG. 5, is fixed permanently at opposite ends to the respective hubs 24 and 28 of the supply and take-up spools 22 and 26. As is now well known, the film strip 48 is packaged in the cassette 10 and initially wound fully on the supply spool 22. From the supply spool 22, the strip extends upwardly about a bobulator roll 50, downwardly about an idler roller 52, and then forwardly past the processing station 46 and the exposure/projection station 36 in a generally linear flight or run to a snubber roller 54 and then to the hub 28 of the take-up spool 26.

The components thus identified in FIG. 1 of the drawings are operative, in conjunction with a camera and a viewing device (not shown) forming part of the overall system in which the cassette is used to expose, process and project the film strip 48 without removal thereof from the cassette 10. In particular, exposure of the film strip is effected by placing the cassette 10 in an appropriate camera. Operation of the camera will drive the take-up spool 26 and otherwise feed the film strip past the station 36 in conventional motion picture fashion to provide a succession of exposed or latent image frames. After exposure and the winding of the film strip 48 onto the take-up spool 26, the cassette is placed in a viewer or a "player" which is automatically programmed to sense the processed or unprocessed condition of the film strip 48 and if unprocessed, to effect a process mode of operation. In the processing operation, the film is rewound from the take-up spool 26 to the supply spool 22. At the initial portion of the processing cycle, the processor 30 is activated so that the liquid processing fluid or liquid 38 will flow through the nozzle 40 and onto the inner surface of the film strip 48. In the present commercial version of the system, when the processing rewind has been completed and following a short imbibition period, the viewer is programmed to effect a mandatory projection cycle during which the film strip 48, with all functioning layers physically retained thereon but chemically modified, is advanced past the exposure/projection station 36 for viewing.

In accordance with the present invention, the cassette 10 is, however, provided with a stripping web 56 shown in FIG. 1 initially extending between the supply and take-up spools 22 and 26 in a manner to be interwound with the film strip 48 but extending through a first web path directly or linearly between the spools and as such, separate from the path through which the film strip 48 passes between the spools 22 and 26. The stripping web 56 is formed of a thin polyester material such as "Mylar" and is preferrably of the same width as the film strip 48.

Figure 3:
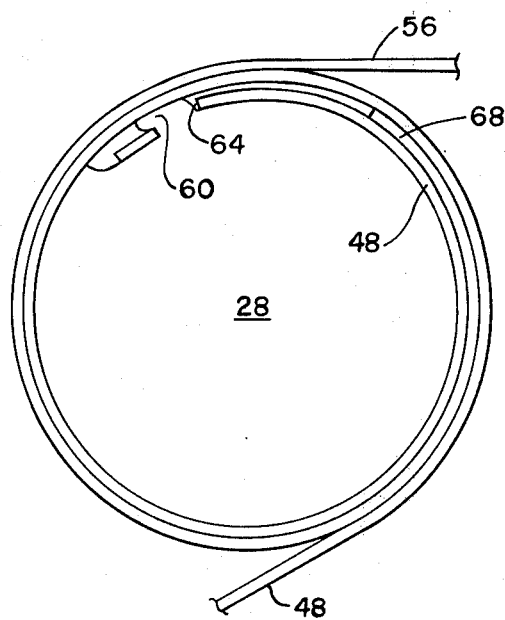
FIG. 3 is an enlarged side elevation illustrating the connection on one end of a film strip to a take-up spool hub.

As may be observed by reference to FIG. 3 of the drawings, the film strip 48 is permanently connected at opposite ends to the hubs 24 and 28 of the respective supply and take-up spools 22 and 26. Although the particular structure by which the film strip 48 is so connected to the hub 24 may differ from that shown in FIG. 3, the provision of recessed lugs 58 and 60 integral with the hubs 24 and 28 and engaging in apertures 62 and 64 at the ends of the film strip will serve to exemplify the permanent connection of the film strip 48 to the hubs.

Figure 3A:
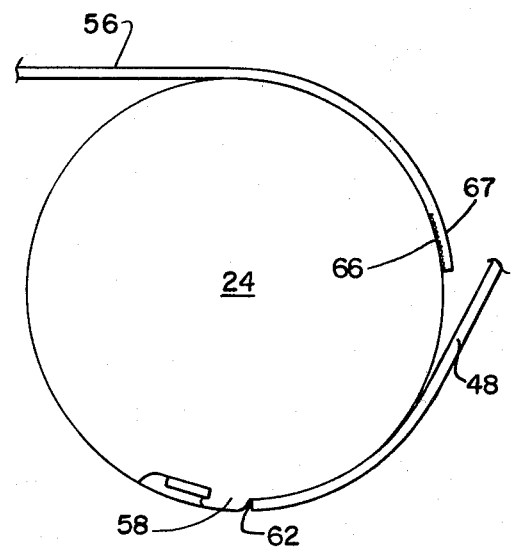
FIG. 3A is an enlarged side elevation showing the connection of the other end of the film strip to a supply spool hub.

The stripping web 56, on the other hand, is effectively shorter in length than the film strip 48 and is releasably coupled to both spools or their hubs 24 and 28. The coupling of the stripping web 56 at one end, its supply end 67, to the supply spool hub 24 (see FIG. 3A) may be accomplished by an area of pressure-sensitive adhesive 66 to facilitate a temporary securement of the end 67 to the peripheral surface of the hub 24. At the take-up spool hub 28 the opposite end, the take-up end 68, of the stripping web 56 may be merely interleaved with initial convolutions of the film strip 48 (see FIG. 3) which in practice will be established by a non-usable take-up leader end portion of the film strip. Also, it is to be noted that in the initial packaging of the film strip and the stripping web in the cassette 10 prior to exposure of the film strip 48, both webs will essentially fill the supply spool 22 with the take-up spool end thereof initially trained on the take-up spool hub in a manner similar to that represented by the illustration in FIG. 3. Thus, on advance of the film strip 48 to the take-up spool 26 during the exposure cycle, both the film strip and the stripping web 56 will be wound on the take-up spool 26.

Alternatively, one or both ends of the stripping web 56 may be coupled to the film strip itself rather than the spools. Thus, the take-up end 68 of the stripping web 56 may be caught or hooked in the leader end of the film (or the take-up hub 28) so as to be drawn by the film strip or take-up spool during forward rotation thereof and then automatically escape or be released therefrom during rewind, just before the take-up spool is almost entirely unwound. On the other hand, the supply end of the web is coupled to the film strip or the supply spool hub, for example by an adhesive area, to initially permit both forward and rewind advancement of the web without release from the film strip. The release of the supply end of the web is then achieved, as explained below, by virtue of the increased force applied to the web by a take-up device 76. Alternatively, the release of the supply end 67 of the web at the end of projection advancement (the second forward advancement) by allowing sufficient unwinding from the supply spool to place the adhesive area under tension rather than shear.

After exposure of the film strip, the cassette may be placed in a viewer or a processing device (not shown) for processing and projection operations. Film strip processing is initiated in conventional fashion and proceeds by rewinding the film strip past the cassette contained processing station 46 and onto the supply spool 22. Simultaneously with such rewinding of the film stirp 48, the stripping web 56 is also rewound on the supply spool 22, but in a manner to separate successive convolutions of the film strip on the supply spool. At the end of such processing rewind, the take-up spool end 68 of the stripping web 56 will pass to the supply spool 22 and extend freely in a generally tangential direction from the outermost convolution on the supply spool 22 at this time.

Also in accordance with the present invention, the interior of the cassette 10 is modified to include a guide channel 69 extending from the exterior of the supply spool 22 to an opening 70 in the top wall 18 of the cassette. The guide channel is defined on one side by a deflector blade 72 and on the other side by a light seal 74.

Figure 4:
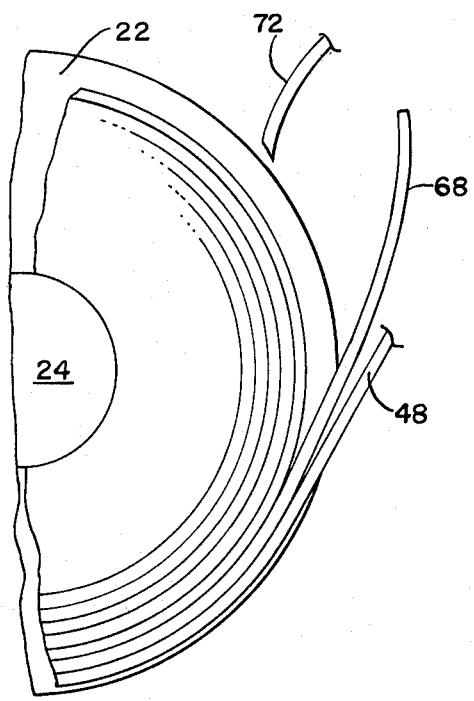
FIG. 4 is an enlarged fragmentary side elevation illustrating the condition of the film strip and separating web prior to being paid out from the supply spool.

The general disposition of the film strip 48 and of the stripping web 56 on the supply spool 22 at the end of the processing operation is depicted in FIG. 4 of the drawings. As shown, the now free end 68 of the stripping web 56, which had been previously interwound with convolutions of the film strip or film strip leader on the take-up spool 28, extends freely from the outer periphery of the wound spool 22. When the direction of supply spool rotation is reversed, the end 68 will engage the deflector wall 72 to initiate movement of the stripping web along a second web path through the channel 69 and the opening 70 in the upper wall 18 of the cassette.

To insure this new advancement of the separating web, the end 68 may be formed as a relatively stiff leader or otherwise treated to assure extension from the periphery of the wound supply spool so that the end 68 will engage the deflector blade 72.

Figure 2:
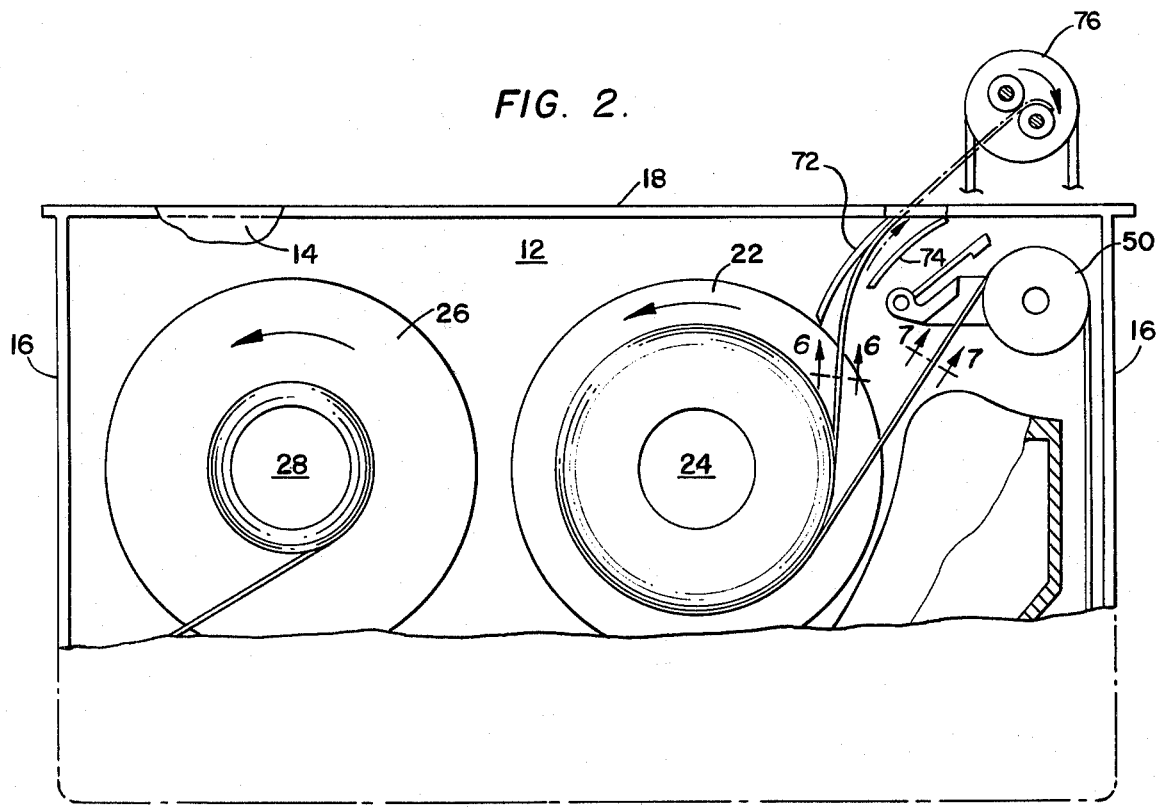
FIG. 2 is a fragmentary side elevation similar to FIG. 1 but showing the cassette components in a different operating condition.

The viewing device or other device (not shown) in which the cassette is processed may be provided with a simple rotating fork take-up device 76 on which the stripping web 56 (see FIG. 2) may be wound temporarily (for later, manual discarding) as it is paid from the supply spool 22. Hence, the take-up fork 76 will, at the end of the first projection cycle following processing, produce enough force on the web 56 that its end 67 attached to the supply spool hub 24 will be drawn from the hub and outwardly of the cassette.

Figure 6:
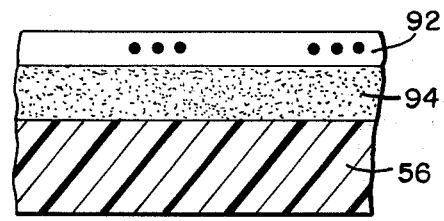
FIG. 6 is an enlarged fragmentary cross-section on line 6—6 of FIG. 2.
Figure 7:
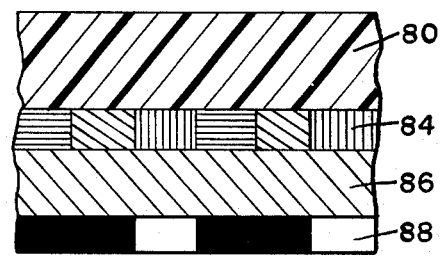
FIG. 7 is an enlarged fragmentary cross-section on line 7—7 of FIG. 2.

The effect of the stripping web 56 on the film strip 48 in operation may be understood by reference to FIGS. 5–7 of the drawings. In FIG. 5, the condition of various functioning layers of photographic material of the film strip is depicted after it has been rewound past the processing station 46, a condition which is represented generally in FIG. 2 of the drawings; the scale of various layers being exaggerated for clarity. As thus shown in FIG. 5, the film strip 48 is constituted by a transparent polyester carrier base 80 through which light is passed in the direction of the arrow 82 during film strip exposure. In the order of such exposure light transmission, the carrier base 80 is followed by a color screen layer 84 which in practice is constituted by a series of red, green and blue lines. Superimposed successively on the color screen are a processing fluid barrier layer 86, a positive image receiving layer 88 depicted in FIG. 5 as a positive silver image, a release coat 90, an emulsion layer 92, depicted in FIG. 5 as a negative image of low covering power, and an inner layer 94 initially containing antihalation dyes and an image stabilizer. Principally to provide an understanding of the surface on which the processing fluid 38 is applied to the film strip 48, the processing fluid is also depicted as a layer although at this stage of the development, much of this layer has been imbibed into the film emulsion.

The release coat 90 may be an alkali-degradable wax, e.g., Bravo wax or other coating, which is at least partially dissolved or degraded by the alkali processing liquid 38 such that, after processing, the release coat 90 reduces the adhesion between the positive image layer 88 and the negative layer 92 to less than the adhesion of the stripping web 56 to the wetted emulsion. In this regard, the adhesion between the web and the wet processed film is facilitated by the imbibition period during which the wet film and web are retained in a wound condition on the supply spool, just following the processing rewind, for a short time period of approximately 10 to 30 seconds to aid image development.

As mentioned previously, the development of the positive silver image in the layer 88 is as a result of the processing fluid diffusing through the inner layer 94 to the emulsion layer 92 where exposed grains of silver halide contained therein are developed and unexposed grains are dissolved and caused to migrate by diffusion transfer to the positive image receiving layer 88 where they are transformed into a variably opaque silver positive image. In the existing "POLAVISION" film, the inner layers 92 and 94, after processing, are essentially transparent but result in a measure of light attenuation when the film strip is projected by light passing in a direction in the reverse of the arrow 82.

In FIGS. 6 and 7 of the drawings, the layers of photographic material separately carried by the stripping web 56 and the carrier base 80 of the film strip 48 during and after removal of the stripping web 56 from the cassette are illustrated. Thus, in FIG. 6, the layers of material disposed inwardly of the release coat 90, specifically the spent emulsion layer 92 as well as the used inner layer 94, are attached by adhesion to the stripping web 56. Likewise as shown in FIG. 7, layers necessary to the viewing of a positive color image, such as the color screen 84 and the positive image receiving layer 88 remain with the carrier base 80 of the film strip. It may be noted also at this point, that the separation of the layers 92 and 94 from the film strip 48 will occur naturally as a result of the tacky characteristics of the inner surface of the film, at least after processing fluid 38 has been deposited on the film strip. This separation is, of course, augmented by the provision in the film strip of the release coat 90 between the layers 88 and 92. As indicated, the release coat may be an alkali-degradable layer or other release coat which may be effected by the processing fluid.

Thus, it will be appreciated that as a result of the present invention, an improved stripping apparatus is provided for multi-purpose film cassettes of the type described and by which the above-mentioned objectives are completely fulfilled. It is contemplated that modifications may be made in the disclosed embodiment without departure from the present invention. Accordingly, it is expressly intended that the foregoing description is illustrative of a preferred embodiment only, not limiting, and that the true spirit and scope of the present invention will be determined by reference to the appended claims.

What is claimed is:

1. A multi-purpose film cassette comprising in combination:
   a light-tight housing defined by spaced parallel side walls peripherally joined by end walls and by top and bottom walls, respectively;
   a pair of supply and take-up spools rotatably supported between said side walls;
   a photographic film strip having opposite ends connected to said spools and comprising a transparent carrier base on which an emulsion comprised of successive layers of photographic materials is provided, said layers including a positive image forming layer adjoining said carrier base and at least an image recording layer superimposed over said positive image forming layer;
   film strip guide means for guiding said film strip between said supply and take-up spools in a film path including an exposure station and a processing station, said processing station including means for depositing a thin layer of processing fluid on the emulsion surface as said film strip is rewound from said take-up spool to said supply spool, and wherein the improvement comprises:
   a separate stripping web having one end releasably coupled to said supply spool so that said stripping web will be interwound with said film strip in alternate convolutions thereon, the other end opposite said one end initially extended to said take-up spool along a web path separate from said film path and its said stations and interwound with convolutions of said film strip on said take-up spool without connection to said take-up spool, and the length of said web relative to the length of said film strip being such that said other end of said web is drawn from said take-up spool when said film strip is fully rewound on said supply spool;
   means defining an exit opening in said housing; and
   web guide means for engaging and guiding said other end of said stripping web along a path separate from said film path and the initial web path and through said exit opening once said web has been substantially entirely wound on said supply spool and is then unwound therefrom upon unwinding rotation of said supply spool;
   so that during processing of said film strip and rewinding thereof in convolutions on said supply spool, said stripping web overlies the processing fluid and said inner layers of said film strip and upon subsequent unwinding of both said film strip and said stripping web and corresponding travel thereof in separate paths, diverging separation of said stripping web from said film strip causes at least a portion of said inner layers to be retained by adhesion on said stripping web as said web is advanced through said exit opening and out of said cassette housing.

2. The apparatus recited in claim 1 wherein said stripping web and said film strip are of substantially the same width.

3. The apparatus recited in claim 1 wherein said stripping web comprises a thin polyester film.

4. The apparatus recited in claim 1 wherein said web guide means comprises an interior cassette wall portion providing a surface for engaging said other end of said stripping web upon unwinding rotation of said supply spool.

* * * * *